(12) United States Patent
Arihara (10) Patent No.: US 9,181,912 B2
(45) Date of Patent: Nov. 10, 2015

(54) CONTROL DEVICE FOR IN-CYLINDER INJECTION TYPE INTERNAL COMBUSTION ENGINE

(75) Inventor: Yoshinobu Arihara, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 40 days.

(21) Appl. No.: 14/119,349

(22) PCT Filed: May 18, 2012

(86) PCT No.: PCT/JP2012/062834
§ 371 (c)(1),
(2), (4) Date: Nov. 21, 2013

(87) PCT Pub. No.: WO2012/161127
PCT Pub. Date: Nov. 29, 2012

(65) Prior Publication Data
US 2014/0182557 A1    Jul. 3, 2014

(30) Foreign Application Priority Data

May 23, 2011  (JP) .................................. 2011-114277

(51) Int. Cl.
*F02D 41/10* (2006.01)
*F02M 69/04* (2006.01)
(Continued)

(52) U.S. Cl.
CPC .............. *F02M 69/04* (2013.01); *F02D 41/047* (2013.01); *F02D 41/126* (2013.01); *F02D 41/402* (2013.01); *F02D 41/403* (2013.01); *F02D 2250/38* (2013.01); *Y02T 10/44* (2013.01)

(58) Field of Classification Search
CPC ..... F02D 41/047; F02D 41/06; F02D 41/061; F02D 41/40; F02D 41/401; F02D 41/402; F02D 41/403; F02D 41/126
See application file for complete search history.

(56) References Cited

U.S. PATENT DOCUMENTS 6,330,796 B1 * 12/2001 Nishimura et al. ............. 60/286
7,900,601 B2 *  3/2011 Gwidt et al. ................. 123/435
(Continued)

FOREIGN PATENT DOCUMENTS

JP    07-042585 A    2/1995
JP    2002-161790 A    6/2002
(Continued)

OTHER PUBLICATIONS

PCT International Search Report on application PCT/JP2012/062834 dated Jun. 19, 2012; 1 page.
(Continued)

*Primary Examiner* — Erick Solis
*Assistant Examiner* — Anthony L Bacon
(74) *Attorney, Agent, or Firm* — Foley & Lardner LLP (57) ABSTRACT

Provided with a control device for an in-cylinder injection type internal combustion engine that reduces an amount of fuel attaching to and remaining on a piston crown surface and a cylinder bore wall surface so as to suppress an increase in the number of exhaust particles of PM when fuel injection is performed a plurality of times in one burning cycle. In divided multi-stage injection in which the fuel to be injected in one burning cycle is divided into a plurality of times, an injection amount rate of injection at an early timing among injections divided into the plurality of times is set according to a fuel cut continuous time at a timing when the fuel injection is resumed from a fuel cut state.

14 Claims, 11 Drawing Sheets (51) Int. Cl.
*F02D 41/40* (2006.01)
*F02D 41/04* (2006.01)
*F02D 41/12* (2006.01)

(56) References Cited

U.S. PATENT DOCUMENTS

| | | | |
|---|---|---|---|
| 2003/0056764 A1* | 3/2003 | Takahashi et al. | 123/491 |
| 2004/0216714 A1* | 11/2004 | Tayama et al. | 123/276 |
| 2009/0133668 A1* | 5/2009 | Ashizawa | 123/305 |
| 2010/0116243 A1* | 5/2010 | Koyama et al. | 123/299 |
| 2011/0144891 A1* | 6/2011 | Nakamura et al. | 701/104 |
| 2011/0155097 A1* | 6/2011 | Matsumufa et al. | 123/299 |
| 2011/0184629 A1* | 7/2011 | Krengel et al. | 701/103 |
| 2011/0307164 A1* | 12/2011 | Arihara et al. | 701/105 |
| 2012/0016571 A1* | 1/2012 | Nada | 701/104 |
| 2014/0074381 A1* | 3/2014 | Sczomak et al. | 701/105 |

FOREIGN PATENT DOCUMENTS

| | | | |
|---|---|---|---|
| JP | 2003-097319 A | | 4/2003 |
| JP | 2006291971 A | * | 10/2006 |
| JP | 2006-348908 A | | 12/2006 |
| JP | 2009-102997 A | | 5/2009 |
| JP | 2009-102998 A | | 5/2009 |

OTHER PUBLICATIONS

PCT International Preliminary Report on Patentability (Chapter 1) on application PCT/JP2012/062834 dated Jun. 19, 2012; 3 pages.

* cited by examiner

CONTROL DEVICE FOR IN-CYLINDER INJECTION TYPE INTERNAL COMBUSTION ENGINE

TECHNICAL FIELD

The present invention relates to a control device for an in-cylinder injection type internal combustion engine.

BACKGROUND ART

An in-cylinder injection type internal combustion engine that directly injects fuel into a combustion chamber is widely known. The in-cylinder injection type internal combustion engine performs direct fuel injection into the combustion chamber with a fuel injection valve, and achieves a reduction in exhaust gas substance and fuel consumption, enhancement in output, and the like.

In the in-cylinder injection type internal combustion engine, the injected fuel may attach to a piston crown surface or a cylinder bore wall surface depending on a fuel injection timing.

If an amount of fuel attaching to/remaining on the cylinder bore wall surface is large, such fuel may not be completely vaporized until ignition in some cases, so that unburned gas is apt to increase. Therefore, for example, JP 2009-102997 A and JP 2009-102998 A disclose a technology of changing, when a temperature on the cylinder bore wall surface is low, the fuel injection timing from an injector in an intake stroke so that the fuel can spread over the piston crown surface and easily vaporized.

In addition, JP 2002-161790 A discloses a technology in which fuel injection is performed a plurality of times in one burning cycle, and the fuel injection amount for each time is accordingly made small, to thereby reduce the fuel attachment to the cylinder bore wall surface, and an interval between one injection and the next injection is kept constant at a rough crank angle with respect to a change in operation conditions of an engine, that is, the injection interval is set to be longer as the rotation becomes lower and is set to be shorter as the rotation becomes higher, to thereby spray the fuel in a dispersed manner.

Meanwhile, if an amount of fuel attaching to and remaining on the piston crown surface and the cylinder bore wall surface is large, the number of exhaust particles of particulate substances (hereinafter, referred to as PM) is apt to increase. In particular, if the amount of fuel attaching to the piston crown surface is large, the number of exhaust particles of PM is apt to increase. In recent years, because of air pollution and impact on human health, there is an increasing need for the in-cylinder injection type internal combustion engine to reduce the number of exhaust particles of PM.

CITATION LIST

Patent Literature

PTL 1: JP 2009-102997 A
PTL 2: JP 2009-102998 A
PTL 3: JP 2002-161790 A

SUMMARY OF INVENTION

Technical Problem

Focusing on the number of exhaust particles of PM, when the injection timing is advanced in order to reduce the amount of fuel attaching to and remaining on the cylinder bore wall surface, the amount of fuel attaching to and remaining on the piston crown surface increases, and the number of exhaust particles of PM increases. Meanwhile, when the injection timing is retarded in order to suppress the increase in the number of exhaust particles of PM, the amount of fuel attaching to and remaining on the cylinder bore wall surface increases, and unburned gas increases.

Further, in a case of divided injection in which a plurality of fuel injections is executed during one burning cycle, an interval between one injection and the next injection is required in the divided injection, and thus an end timing of the injection is closer to the retard side than the case of injecting the fuel only once in one burning cycle. As a result, the fuel injected until the ignition may not be completely vapored in some cases, and the degree of homogeneity of mixture gas in the cylinder is lowered.

An objective of the present invention is to provide a control device for an in-cylinder injection type internal combustion engine that reduces an amount of fuel attaching to and remaining on a piston crown surface and a cylinder bore wall surface so as to suppress an increase in the number of exhaust particles of PM, when fuel injection is performed a plurality of times in one burning cycle in the in-cylinder injection type internal combustion engine.

In order to achieve the objective, the present invention provides a control device of an in-cylinder injection type internal combustion engine in which fuel is subjected to divide injections into a combustion chamber a plurality of times in one burning cycle, when fuel injection into the combustion chamber is resumed after the fuel injection into the combustion chamber is temporarily stopped according to an operation state of a vehicle, in a case where a fuel cut period from when the fuel injection is stopped to when the fuel injection is resumed is long, at least a first injection amount rate among the divided injections is controlled to decrease compared with remaining injection amount rates of the divided injections than a case where the fuel cut period is short.

Advantageous Effects of Invention

According to the present invention, in divided multi-stage injection in which the fuel to be injected in one burning cycle is divided into a plurality of times, an amount of fuel attaching to and remaining on a piston crown surface and a cylinder bore wall surface can be reduced, and an increase in the number of exhaust particles of PM can be suppressed.

REFERENCE SIGNS LIST 1 in-cylinder injection type internal combustion engine
101 engine control unit
102 air cleaner
103 airflow sensor
104 electronic control throttle valve
105 intake pipe
106 combustion chamber
107 throttle opening degree sensor
108 high pressure fuel pump
109 injector
110 ignition coil
111 ignition plug
112 EGR pipe
113 EGR control valve
114 EGR flow rate sensor
115 crank shaft
116 crank angle sensor
117 common rail
118 intake air temperature sensor
201 cam angle sensor
202 water temperature sensor
203 air fuel ratio sensor
204 fuel pressure sensor
205 oil temperature sensor
206 high pressure pump solenoid
207 low pressure fuel pump

DESCRIPTION OF EMBODIMENTS

Hereinafter, embodiments of the present invention will be described in detail with reference to the drawings.

Figure 1:
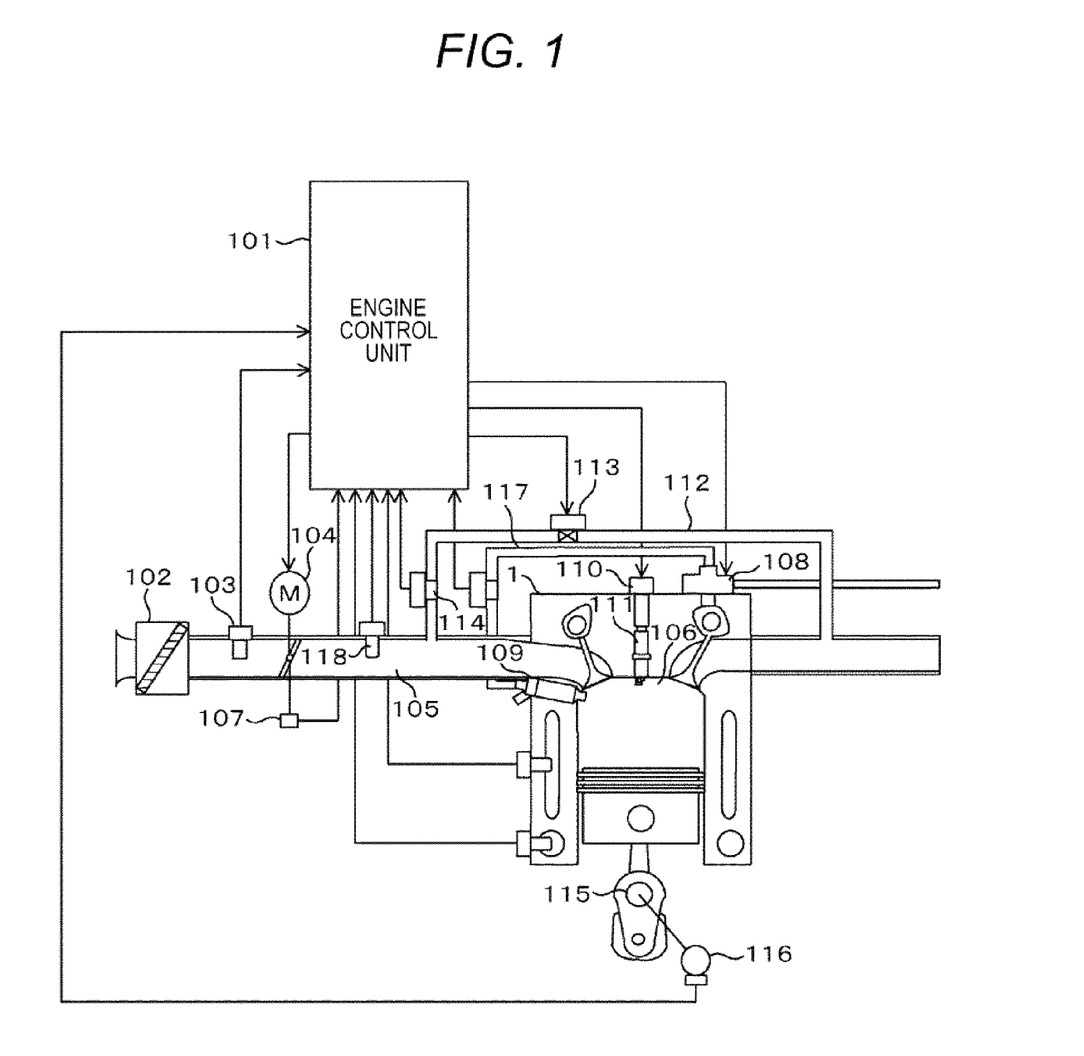
FIG. 1 is a configuration schematic view of an overall control system of an in-cylinder injection type engine according to an embodiment of the present invention.

FIG. 1 is a configuration schematic view of an overall control system of an in-cylinder injection type internal combustion engine 1 that constitutes an embodiment of the present invention. Intake air taken in from an entrance part of an air cleaner 102 passes through an intake airflow meter (airflow sensor) 103, passes through an electronic control throttle valve 104 that controls an intake air flow rate, is distributed to each intake pipe 105 connected to each cylinder, and then is introduced into a combustion chamber 106 of each cylinder. In addition, a signal representing the intake air flow rate is output from the intake airflow meter 103 to an engine control unit 101. A throttle opening degree sensor 107 that detects the degree of opening of the electronic control throttle valve 104 is attached, and a signal therefrom is also output to the engine control unit 101. In addition, an intake air temperature sensor 118 is attached to the intake pipe 105 that detects an intake air temperature, and a signal therefrom is also output to the engine control unit 101.

Fuel is primarily pressurized by a low pressure fuel pump (not illustrated), then is secondarily pressurized into a higher pressure by a high pressure fuel pump 108, and is injected into the combustion chamber 106 through an injector 109 provided in each cylinder via a common rail 117. The fuel injected into the combustion chamber is used to generate mixture gas with the intake air, is ignited at an ignition plug 111 by ignition energy from an ignition coil 110, and burns inside the combustion chamber 106.

Exhaust gas discharged from the combustion chamber 106 is discharged to an exhaust pipe, and an EGR inlet is formed in the middle of the exhaust pipe. Part of the exhaust gas flowing through the exhaust pipe (EGR gas) enters an EGR pipe 112 through the EGR inlet, flows into an EGR control valve 113, and flows back into the intake pipe 105 through an EGR outlet.

A flow rate of the EGR gas is adjusted by the EGR control valve 113. An EGR flow rate sensor 114 for measuring the flow rate of the EGR gas is attached inside the EGR pipe. A flow rate detection signal of the EGR flow rate sensor is output to the engine control unit 101.

A crank angle sensor 116 attached to a crank shaft 115 of the engine outputs a signal representing a rotation position of the crank shaft to the engine control unit 101.

Figure 2:
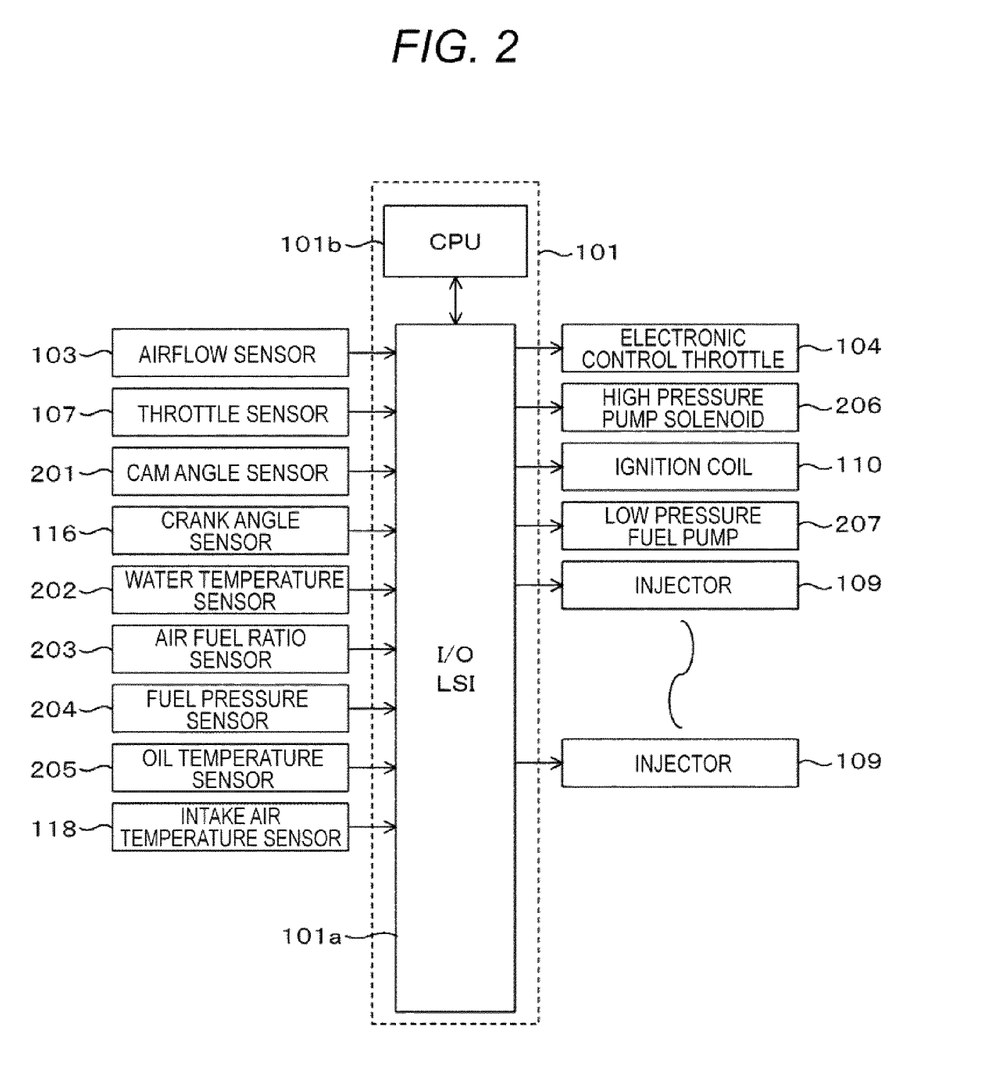
FIG. 2 is a block diagram illustrating an input/output signal relation of an engine control unit, which is used in a system configuration describing an embodiment of a control device for the in-cylinder injection type engine according to the embodiment of the present invention.

FIG. 2 illustrates an input/output relation of the engine control unit. The engine control unit 101 includes an I/O LSI 101a including an A/D converter, a CPU 101b, and the like. The engine control unit 101 is configured to take in, as inputs, signals from various sensors including the airflow sensor 103, the throttle opening degree sensor 107, the crank angle sensor 116, a water temperature sensor 202, an air fuel ratio sensor 203, a fuel pressure sensor 204, an oil temperature sensor 205, and the EGR flow rate sensor 114, execute predetermined arithmetic processing, output various control signals calculated as arithmetic processing results, and supply predetermined control signals to the electronic control throttle valve 104, a high pressure pump solenoid 206, the ignition coil 110, and each injector 109, which are actuators, to execute control of fuel pressure inside of the common rail, fuel injection amount control, ignition timing control, and the like. The I/O LSI is provided with a drive circuit that drives each injector, causes a step-up circuit (not illustrated) to raise and supply a voltage supplied from a battery, and causes an IC (not illustrated) to control a current, to thereby drive each injector.

A relation between a fuel injection timing and a PM emission amount will be described with reference to FIG. 3.

Figure 3:
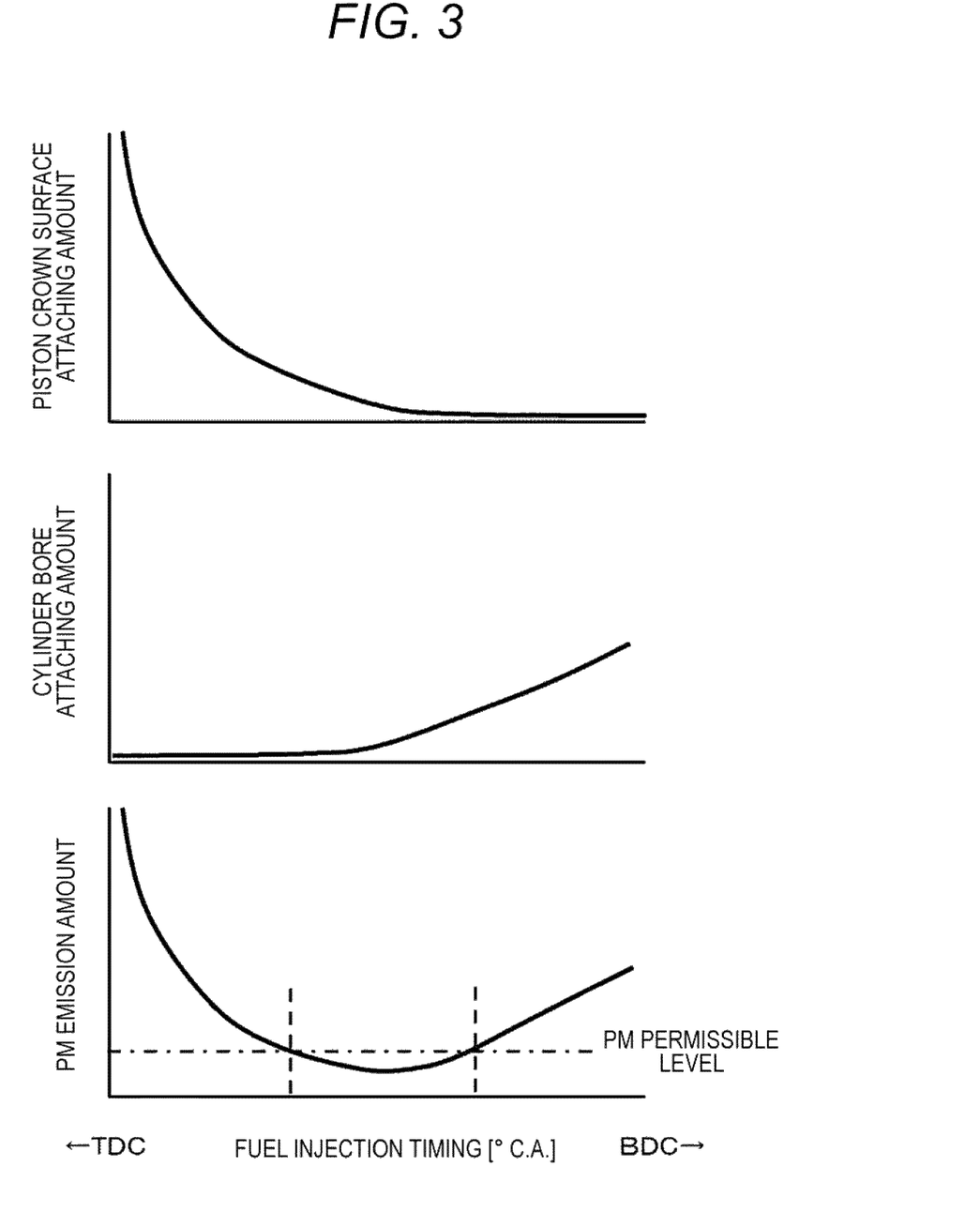
FIG. 3 is a diagram illustrating relations of a fuel attaching amount and a PM emission amount with a fuel injection timing.

FIG. 3 illustrates relations of a fuel attaching amount to a piston crown surface, a fuel attaching amount to a cylinder bore, and the PM emission amount with the injection timing when the fuel is injected once in one burning cycle. The horizontal axis of each drawing represents an injection timing during an intake stroke of the engine. TDC means a top dead center and BDC means a bottom dead center of a piston. In the case where the fuel injection timing is too early (near TDC), the fuel attaching amount to the piston crown surface increases, and the PM generation amount is apt to increase. Meanwhile, in the case where the fuel injection timing is too late (near BDC), the fuel attaching amount to the cylinder bore increases, and similarly, the PM generation amount is apt to increase. In this way, in the in-cylinder injection type internal combustion engine, when the injection timing is advanced to reduce the amount of fuel attaching to/remaining on the cylinder bore wall surface, the amount of fuel attaching to/remaining on the piston crown surface increases, and the number of exhaust particles of PM is apt to increase. Meanwhile, when the injection timing is retarded to suppress an increase in the number of exhaust particles of PM, the amount of fuel attaching to/remaining on the cylinder bore wall surface increases, and the unburned gas is apt to increase.

Note that influence of the PM generation amount on the fuel attachment to the cylinder bore is relatively smaller than on the fuel attachment to the piston crown surface.

To minimize the PM generation amount when the fuel is injected once in one burning cycle, it is desirable to inject the fuel during an intake stroke middle period in which the sum of the fuel attaching amount to the piston crown surface and the fuel attaching amount to the cylinder bore is smallest.

Relations of the PM emission amount, the fuel consumption rate, and the oil dilution amount will be described with reference to FIG. 4.

Figure 4:
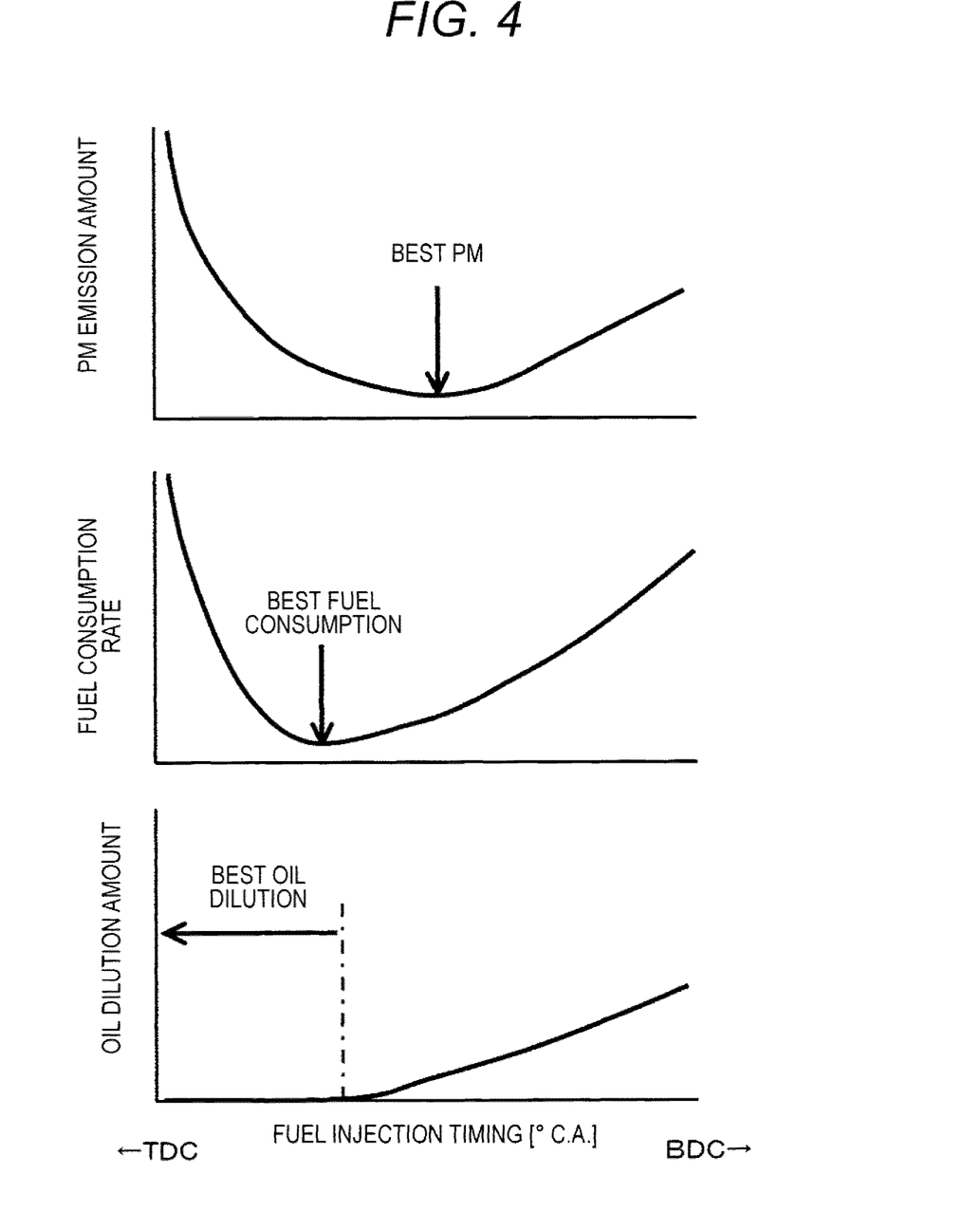
FIG. 4 is a diagram illustrating relations of the PM emission amount, a fuel consumption rate, and an oil dilution amount with the fuel injection timing.

FIG. 4 illustrates the PM emission amount, the fuel consumption rate, and the oil dilution amount when the fuel injection timing is changed. The fuel injection timing at which the PM emission amount becomes smallest falls within the intake stroke middle period, whereas the fuel injection timings at which the fuel consumption rate and the oil dilution amount become smallest fall within an intake stroke initial period. To make all the parameters the best, it is desirable to reduce PM at an early fuel injection timing.

A relation between the number of divided injections and the PM emission amount will be described with reference to FIG. 5.

Figure 5:
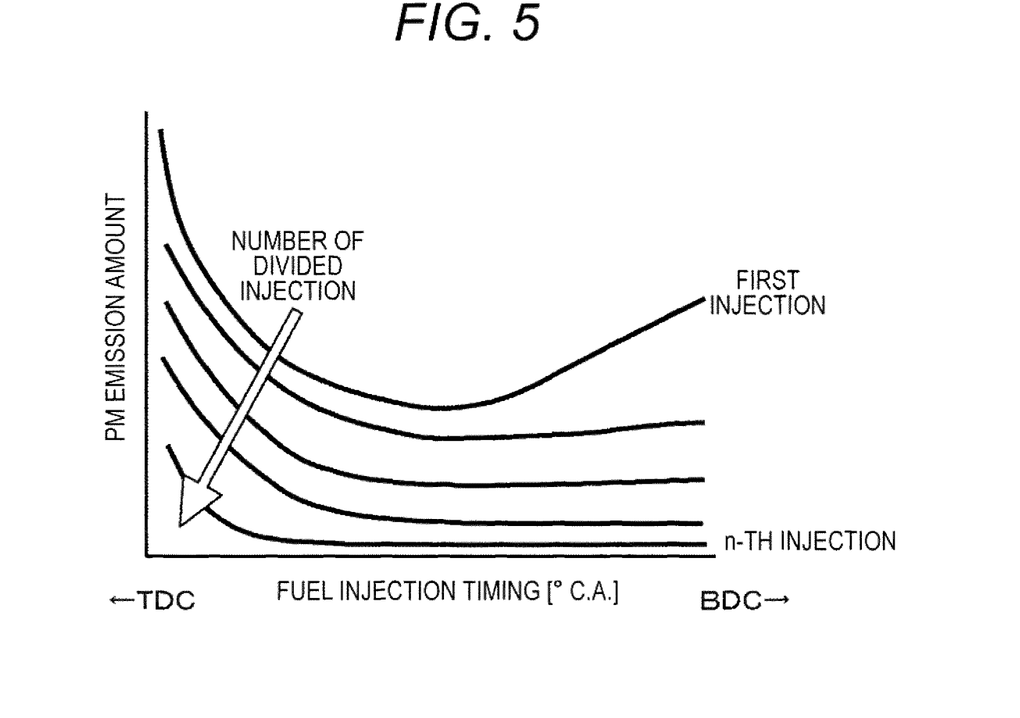
FIG. 5 is a diagram illustrating a relation between the number of divided injections and the PM emission amount.

FIG. 5 illustrates the PM emission amounts with respect to division number of times when the amount of fuel necessary in one burning cycle is divided into a plurality of times and is injected. Since the fuel injection amount per one divided injection is decreased as the division number of times is increased, the fuel attachment to the piston crown surface is decreased, and the PM emission amount is decreased.

Figure 6:
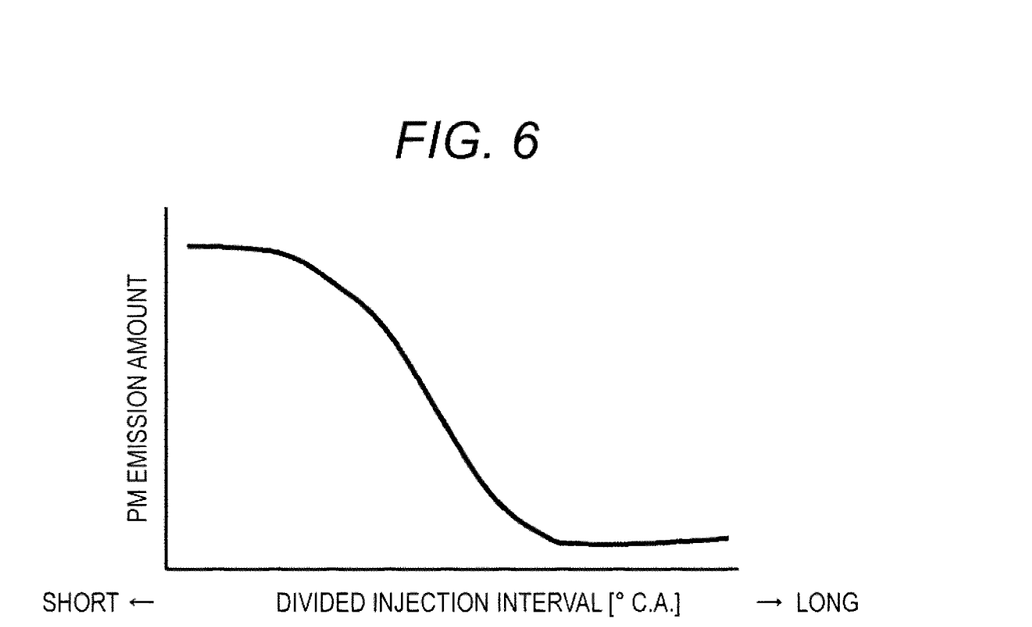
FIG. 6 is a diagram illustrating a relation between a divided injection interval and the PM emission amount.

A relation between a divided injection interval and the PM emission amount will be described with reference to FIG. 6.

If the divided injection interval is too short, an effect of the divided injection cannot be sufficiently obtained, and thus reduction in PM emission amount cannot be achieved. This means that it is necessary to set an interval between one injection and the next injection to a predetermined interval or longer in order to reduce the PM emission amount.

In this way, in the divided injection, it is effective to set the interval between one injection and the next injection to a predetermined interval or longer in order to reduce the PM emission amount. However, an end timing of the injection is closer to the retard side than the case of injecting the fuel only once in one burning cycle. When the end timing of the finally divided injection is at the retard side than a predetermined crank angle, the fuel injected until the ignition may not be completely vapored in some cases, and the degree of homogeneity of mixture gas in the cylinder is apt to be lowered.

A relation between a fuel cut continuous time and the PM emission amount will be described with reference to FIGS. 7(A) to 7(C).

Figure 7:
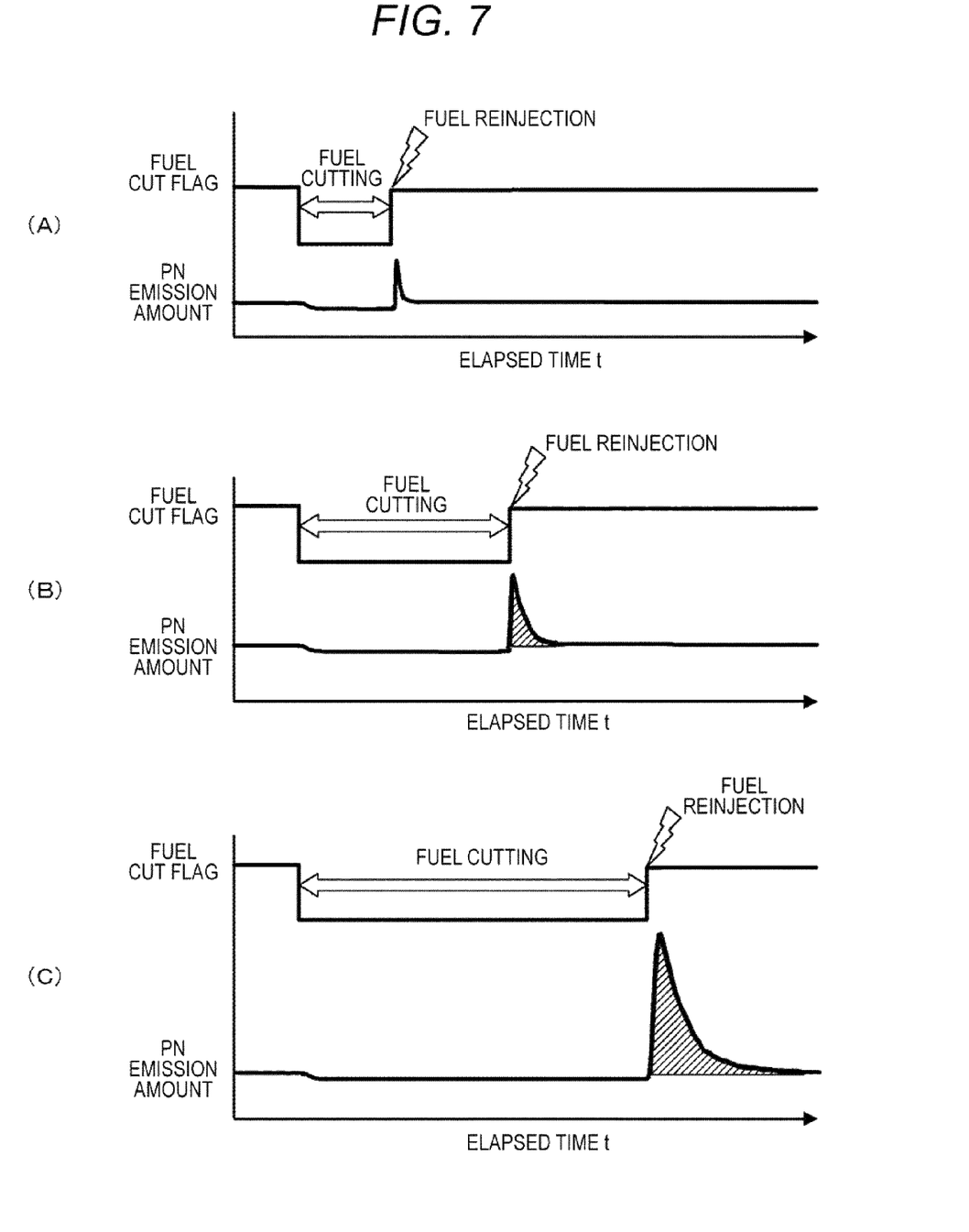
FIGS. 7(A) to 7(C) are diagrams illustrating a relation between a fuel cut continuous time and the PM emission amount.

FIGS. 7(A) to 7(C) illustrate the PM emission amount when the fuel injection is temporarily stopped depending on an operation state such as deceleration, a start-stop, and motor driving of a hybrid vehicle, and the fuel injection is then resumed in the divided injection with a certain division number of fuel injections. The PM emission amount is largely different depending on the time in which the fuel cut is continued. That is, when the fuel cut continuous time is short, the PM emission amount is small as illustrated in FIG. 7(A), whereas the PM emission amount is apt to increase as the fuel cut continuous time is longer as illustrated in FIG. 7(C). When the fuel cut continuous time is short, the fuel is injected in a state where the temperature of the in-cylinder wall surface including the piston crown surface is high, and the fuel attaching to/remaining on the surfaces is small due to the facilitation of the vaporization of the fuel. Meanwhile, when the fuel cut continuous time is long, the fuel is injected in a state where the temperature of the in-cylinder wall surface including the piston crown surface gets lowered, the vaporization of the fuel becomes dull, and the fuel attaching to/remaining on the surface becomes increased.

In this way, the fuel attaching amounts to the piston crown surface and the cylinder bore has a close relation to the temperatures of the piston crown surface and the cylinder bore wall surface, and the fuel attaching amount is increased as the temperatures are lower. Especially, in a case where the fuel cut is executed, when the temperature in the cylinder including the piston crown surface gets lowered, the fuel attaching amount is increased when the fuel injection is resumed.

As described above, to suppress the PM emission amount, the divided injection in which the fuel injection is executed a plurality of times in one burning cycle is effective. At a timing when the in-cylinder temperature is lowered, especially, at a timing when the fuel injection is resumed from a fuel cut state, it is necessary to advance a first injection among the plurality of injections as much as possible and to reduce the fuel attaching to/remaining on the piston crown surface so as to reduce the fuel attaching to/remaining on the cylinder bore wall surface.

Next, specific control contents of divided multi-stage injection control of the internal combustion engine according to the present embodiment will be described with reference to FIGS. 8 to 11.

Figure 8:
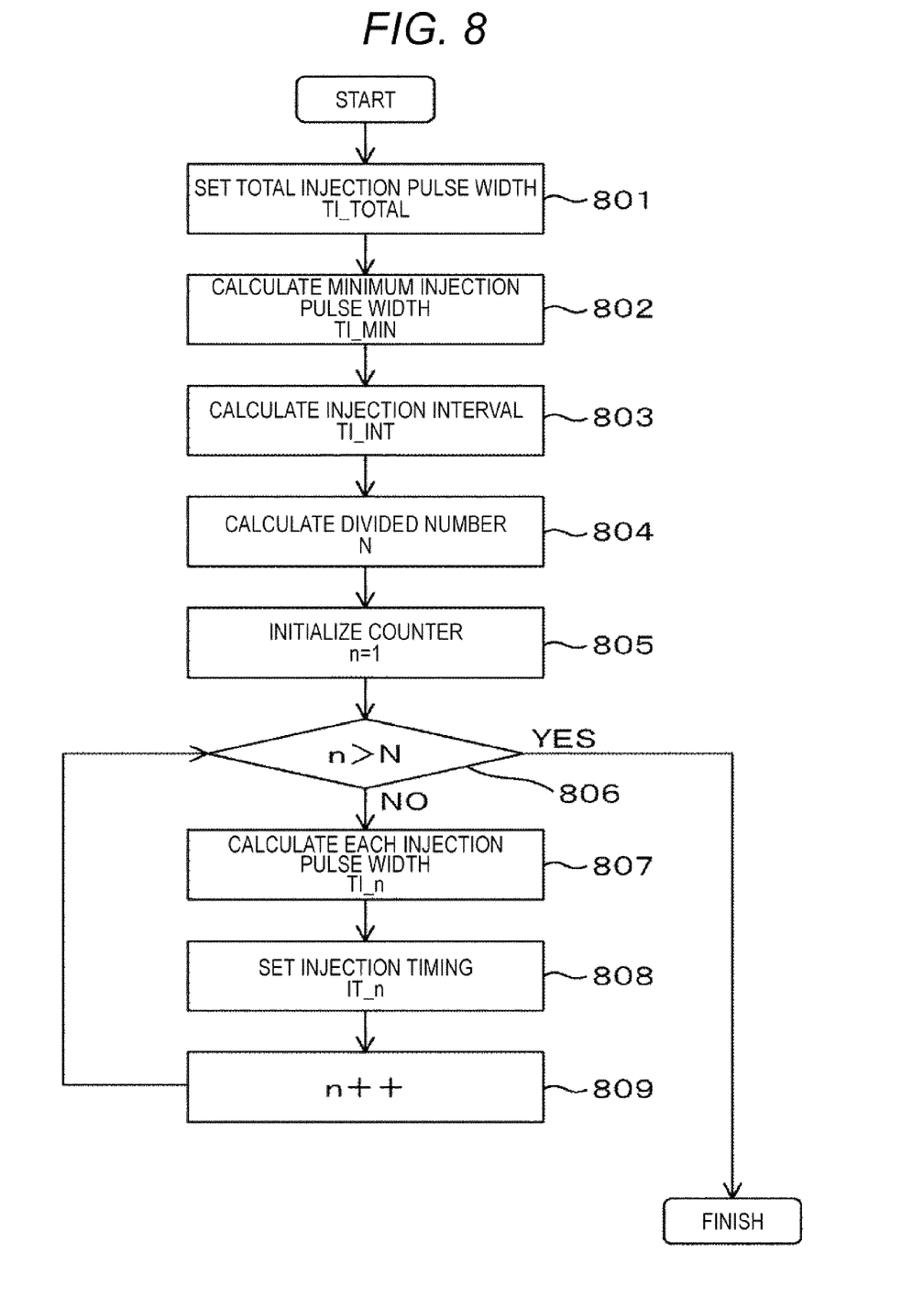
FIG. 8 is a flowchart illustrating control contents of divided multi-stage injection control of the in-cylinder injection type engine according to the embodiment of the present invention.

FIG. 8 is a flowchart illustrating the control contents of the divided multi-stage injection control according to the embodiment of the present invention.

The contents are programmed in a storage area such as a ROM (not illustrated) of the engine control unit 101, are read out in a predetermined cycle or in a predetermined cycle according to an operation state, and are repeatedly executed in the CPU 101*b*. The engine control unit 101 supplies a predetermined control signal to each injector 109, and executes a plurality of fuel injections in one burning cycle based on an injection pulse width and an injection timing calculated according to the processing contents of FIG. 8.

In step 801, a total injection pulse width TI_TOTAL, which is a total amount of fuel injected in one burning cycle from each fuel injector 109, is set. The total injection pulse width TI_TOTAL is set according to an intake air amount measured by the airflow sensor 103, an air fuel ratio set according to an operation state and the like, a fuel pressure calculated using a signal of the fuel pressure sensor 204, and the like.

In step 802, a minimum injection pulse width TI_MIN is calculated. Here, the minimum injection pulse width is set according to various characteristics such as a fuel pressure characteristic, an electrical characteristic, and a mechanical characteristic of the injector 109, and a drive current waveform of the injector.

In step 803, the injection interval, which is an injection interval between divided injections, is calculated. The injection interval is set to a predetermined interval or longer in terms of fuel attachment and the homogeneity of the mixture gas, and in terms of securement of an injector drive current. If the injection interval is too short, a fuel spray state becomes substantially the same as that of one-time injection. As a result, an effect of the divided injection cannot be obtained, and the fuel attachment to the piston crown surface and to the cylinder bore cannot be decreased. In addition, each time the injector drive circuit drives the injector, a voltage in the step-up circuit drops. Therefore, a period of time until a return to its original voltage is required, and it is necessary to wait for the next fuel injection during this step-up return period.

In step 804, the number of divisions N is set. The number of divisions N is determined according to an engine rotation speed and an engine loaded state parameter.

In step 805, a counter n is initialized.

In step 806, whether the counter n is larger than the number of divisions N is determined. If yes (settings of n=1 to N are completed), the processing is terminated. If the counter n is equal to or smaller than the number of divisions N, processing in step 807 and the subsequent steps are performed.

Figure 9:
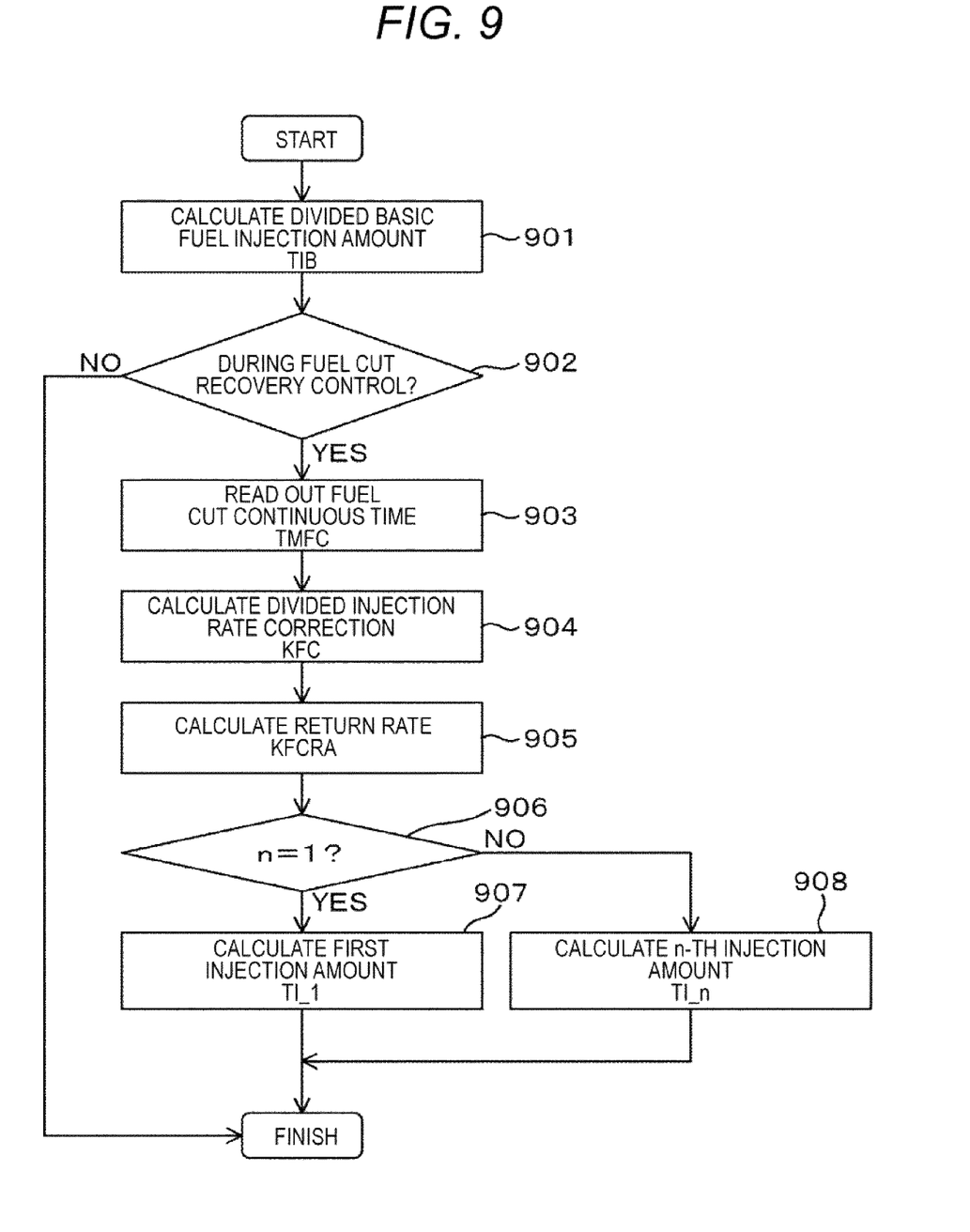
FIG. 9 is a flowchart illustrating processing contents of divided injection amount setting illustrated in FIG. 8.

In step 807, an injection pulse width TI_n (n=1 to N) of each injection is calculated. Details of step 807 are illustrated in FIG. 9.

Figure 10:
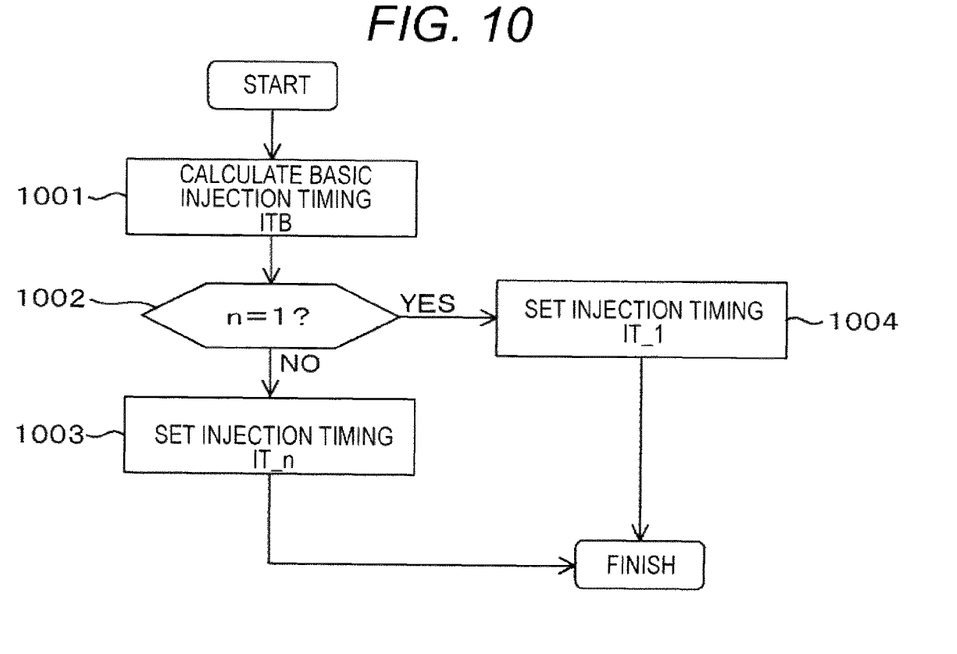
FIG. 10 is a flowchart illustrating processing contents of a divided injection timing illustrated in FIG. 8.

In step 808, an injection timing of each injection in the divided multi-stage injection is set. Details of step 808 are illustrated in FIG. 10.

In step 809, increment processing of the counter n is performed, and the processing returns to step 806. In this way, the processing of n=1 to N is repeated, and each injection pulse width and each injection timing are set.

Details of step 807 (injection pulse width of each injection) of step 807 of FIG. 8 will be described with reference to FIG. 9.

In step 901, a basic injection pulse width TIB (n=1 to N) of each injection to be divided is calculated. A division expression of TI_TOTAL/N is calculated using the total injection pulse width TI_TOTAL calculated in step 801 and the number of divisions N calculated in step 804.

In step 902, whether it is during fuel cut recovery control is determined. When it is not during the fuel cut recovery control, it is determined that each injection to be divided TI_n (n=1 to N)=TIB, and the processing is terminated. If it is during the fuel cut recovery control, the processing proceeds to step 903.

In step 903, a time TMFC in which the fuel cut is continued is calculated.

Figure 11:
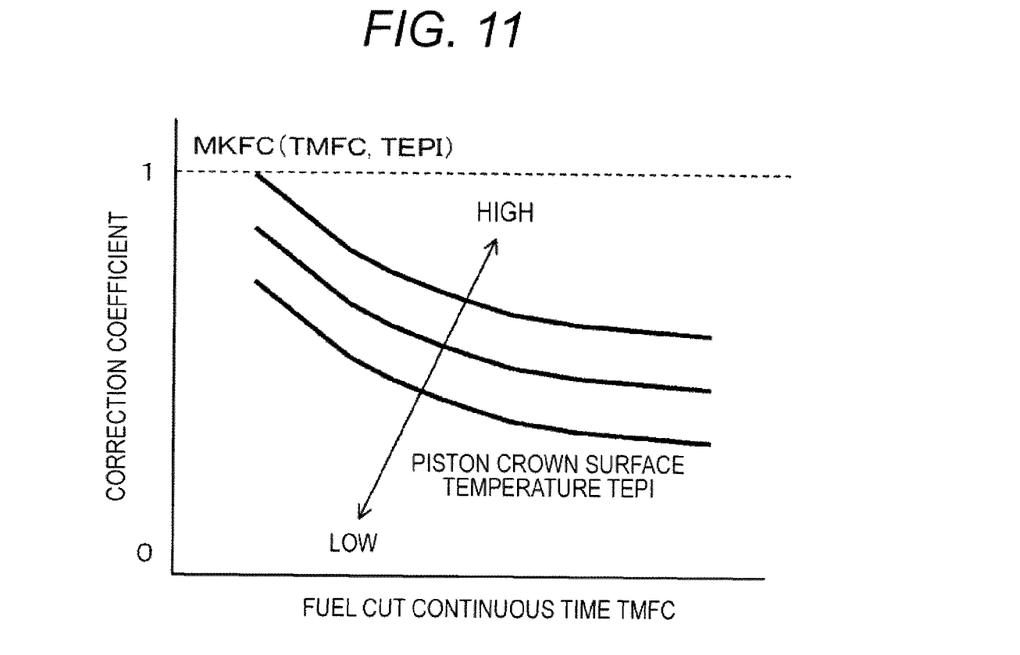
FIG. 11 is a diagram illustrating a map function for calculating the divided injection amount illustrated in FIG. 9.

In step 904, a correction coefficient of a divided injection rate at the fuel cut recovery is calculated according to the fuel cut continuous time TMFC. A correction coefficient KFC is calculated by referring to a map MKFC as illustrated in FIG. 11 using the fuel cut continuous time TMFC calculated in step 903 and a piston crown surface temperature TEPI as inputs. Accordingly, correction of the divided injection rate according to the in-cylinder temperature becomes possible.

It is desirable to estimate the piston crown surface temperature TEPI by configuring a thermal model using an intake air amount, an air fuel ratio, and an ignition timing. Alternatively, the piston crown surface temperature TEPI may be estimated, from a point of view of simplification in control, by using a water temperature, an oil temperature, and an intake air temperature detected by the water temperature sensor 202, the oil temperature sensor 205, and the intake air temperature sensor 118 as input values, and searching the map. Note that, in calculating the correction coefficient KFC, either the fuel cut continuous time TMFC or the piston crown surface temperature TEPI may be used as an input.

Figure 12:
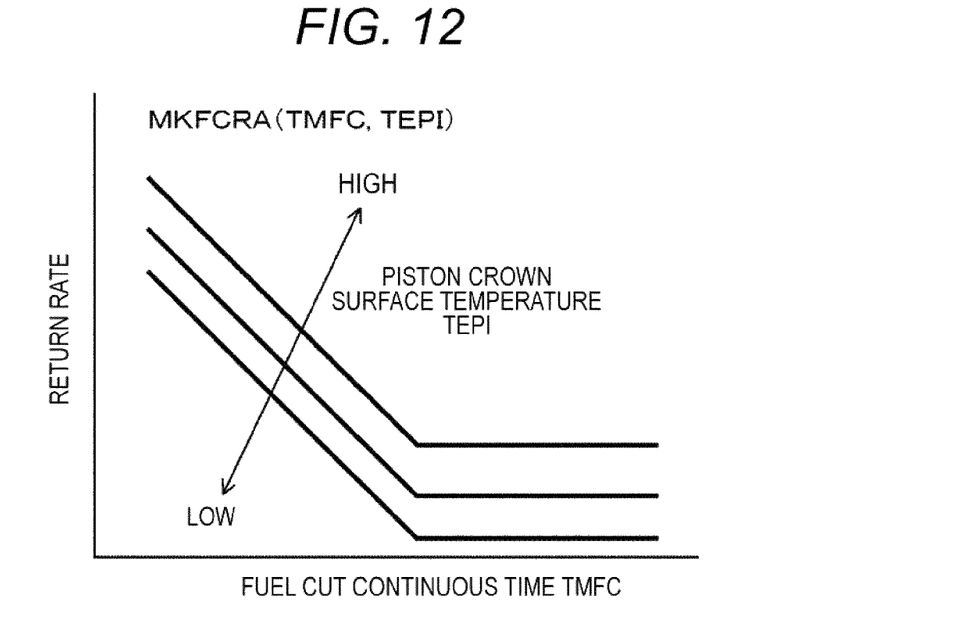
FIG. 12 is a diagram illustrating a map function for calculating the divided injection amount illustrated in FIG. 9.

In step 905, a correction amount KFCRA used for returning to a fuel injection rate in a normal state from the fuel cut recovery according to the fuel cut continuous time TMFC. A return correction coefficient is calculated by referring to a map MKFCRA as illustrated in FIG. 12 using the fuel cut continuous time TMFC calculated in step 903 and the piston crown surface temperature TEPI as inputs. Accordingly, it becomes possible to return to a normal injection rate at a proper timing according to an in-cylinder temperature in conjunction with correction of the divided injection rate.

The map MKFCRA is set in consideration of an influence of the piston crown surface temperature TEPI on a fuel attaching amount and a vaporization rate. Note that, in calculating the correction coefficient KFCRA, either the fuel cut continuous time TMFC or the piston crown surface temperature TEPI may be used as an input.

It is desirable to estimate the piston crown surface temperature TEPI by configuring a thermal model using an air amount, an air fuel ratio, and an ignition timing. Alternatively, the piston crown surface temperature TEPI may be estimated, from a point of view of simplification in control, by using a water temperature, an oil temperature, and an intake air temperature detected by the water temperature sensor 202, the oil temperature sensor 205, and the intake air temperature sensor 118 as input values, and searching the map. In step 906, whether it is a first injection among divided injections is determined.

When n=1, the processing proceeds to step 907, and the first injection amount is calculated.

The first injection amount TI_1 is calculated with the following expression (1) using TIB as an upper limit value.

$$TI\_1 = TIB \times KFC + KFCRA \quad \text{Expression (1)}$$

When n≠1, the processing proceeds to step 908, and a second and subsequent injection amounts are calculated.

The second and the subsequent injection amounts TI_n are calculated with the following expression (2).

$$TI\_n = TIB + (TIB - TI\_1)/N \quad \text{Expression (2)}$$

Details of step 808 (injection timing setting) of FIG. 8 will be described with reference to FIG. 10.

In step 1001, a basic injection timing is calculated.

Figure 13:
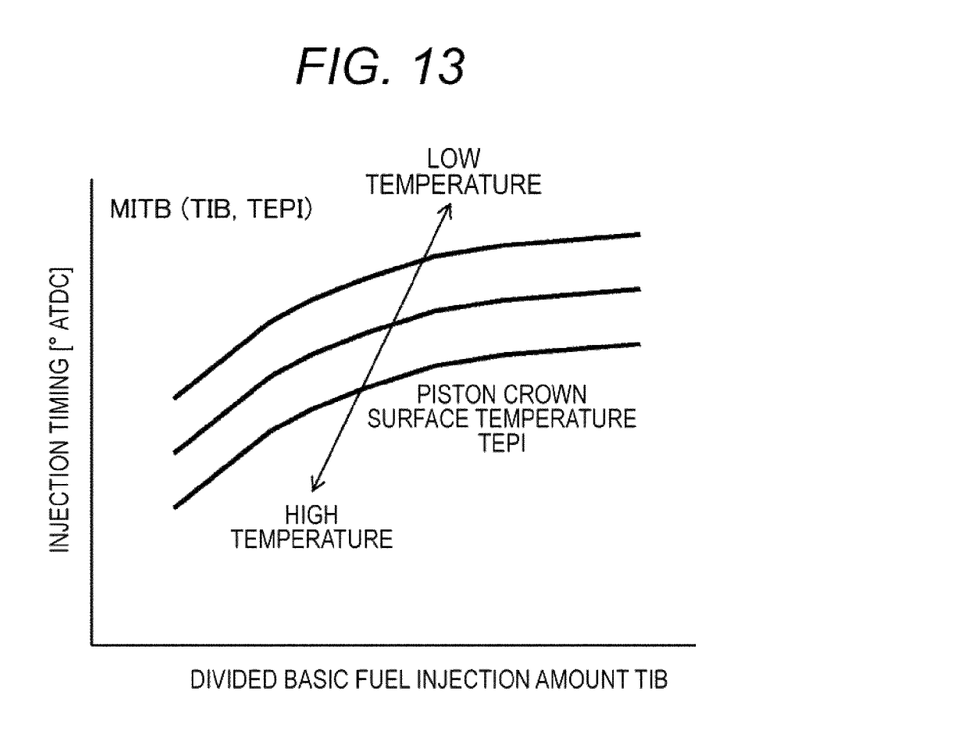
FIG. 13 is a diagram illustrating a map function for calculating the injection timing illustrated in FIG. 10.

A basic injection timing ITB is calculated by referring to a map MITB as illustrated in FIG. 13 using, as inputs, the divided basic fuel injection amount TIB calculated in step 901 of FIG. 9 and the piston crown surface temperature TEPI. The map MITB is set in consideration of an influence of the piston crown surface temperature TPI on a fuel attaching amount and a vaporization rate. In addition, it is desirable to estimate the crown surface temperature TEPI by configuring a thermal model using an air amount, an air fuel ratio, an ignition timing, and the like. Alternatively, from a point of view of simplification in control, the crown surface temperature TEPI may be estimated by using, as input values, a water temperature, an oil temperature, and an intake air temperature detected by the water temperature sensor 202, the oil temperature sensor 205, and the intake air temperature sensor 118, and by searching the map. Alternatively, the fuel cut continuous time TMFC may be used as the input in conjunction with the crown surface temperature TEPI in place of the crown surface temperature TEPI.

In step 1002, whether it is setting of a first injection timing among the divided injections in one burning cycle is determined. When n=1, the processing proceeds to step 1004, and it is terminated that the first injection timing IT_1=ITB. When n≠1 (in the case of the second or subsequent injection timings), the processing proceeds to step 1003, and an n-th injection start possible angle IT_n is calculated. The n-th injection start possible angle IT_n is calculated by adding the injection pulse width TI_(n−1) after division and the injection interval TI_INT calculated in step 803 of FIG. 8 to the previous IT_(n−1).

A specific control example when being configured as illustrated in FIGS. 8 to 13 using FIGS. 14 and 15 will be described.

Figure 14:
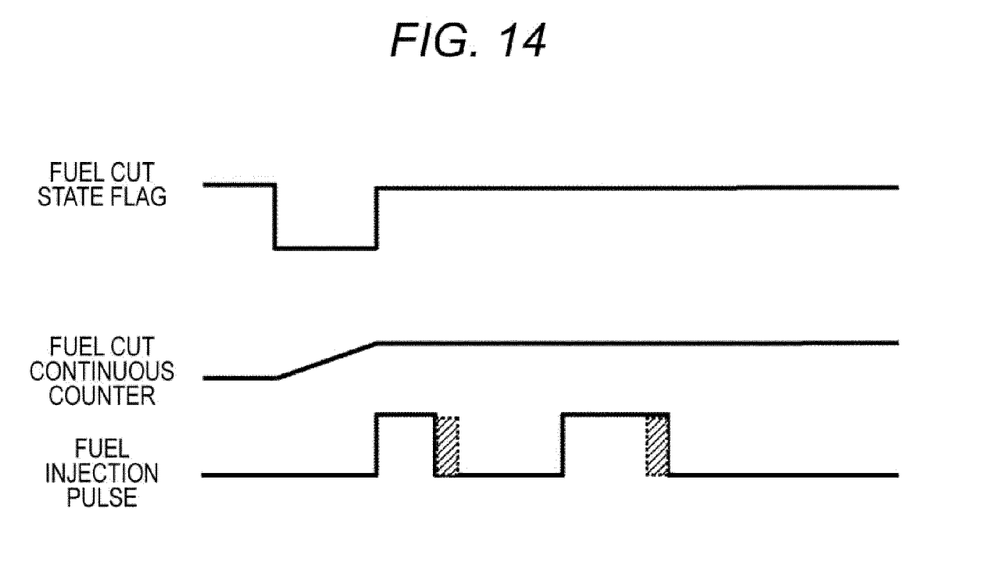
FIG. 14 is a diagram illustrating a control example of the divided multi-stage injection control according to the embodiment of the present invention.
Figure 15:
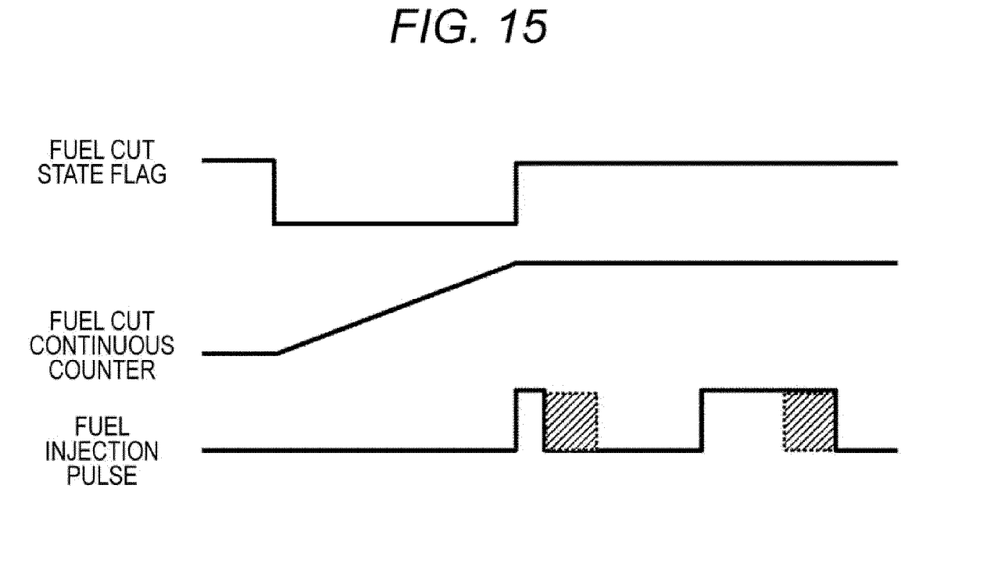
FIG. 15 is a diagram illustrating a control example of the divided multi-stage injection control according to the embodiment of the present invention.

FIG. 14 is a diagram illustrating a case where the fuel cut continuous time is short, and FIG. 15 is a diagram illustrating an injection rate at a divided injection in a case where the fuel cut continuous time is long. When the fuel cut is started, the fuel cut continue counter starts count up, and when the fuel is reinjected, fuel cut continue counter stops the count up and calculates a fuel cut continuous time.

In FIG. 15 in which the fuel cut continuous time is long compared with FIG. 14 in which the fuel cut continuous time is short, the first injection rate is decreased and the second injection rate is increased by the decreased amount. Here, the second injection is exemplarily illustrated. However, a similar process is applicable regardless of the number of injections, and the first decreased amount is added to the second and the subsequent injections.

With such a configuration, in the divided multi-stage injection in which the fuel to be injected in one burning cycle is divided into a plurality of times, since the injection amount rate of injection at an early timing among the injections divided into the plurality of times is set according to the fuel cut continuous time at a timing when the fuel injection is resumed from a fuel cut state, the injection at the early timing is advanced as much as possible and the amount of fuel attaching to/remaining on the piston crown surface can be reduced, and the increase in the number of exhaust particles of PM can be suppressed.

The invention claimed is:

1. A control device of an in-cylinder injection type internal combustion engine in which fuel is subjected to divided injections into a combustion chamber a plurality of times in one burning cycle,
   when fuel injection into the combustion chamber is resumed after the fuel injection into the combustion chamber is temporarily stopped according to an operation state of a vehicle,
   at least a first injection amount rate among the divided injections is controlled to decrease compared with remaining injection amount rates of the divided injections,
   wherein the decrease is greater when a fuel cut period, from when the fuel injection is stopped to when the fuel injection is resumed, is longer,
   wherein the control device comprises a CPU and a I/O LSI, the I/O LSI comprising an A/D converter and a drive circuit configured to drive fuel injectors,
   wherein the control device is configured to:
      set, via the CPU, a total injection pulse width;
      calculate, via the CPU, a minimum injection pulse width;
      calculate, via the CPU, an injection interval between divided injections;
      set, via the CPU, a number of divisions; and
      while the number of divided injection is less than the number of divisions,
         calculate, via the CPU, an injection pulse width;
         set, via the CPU, an injection timing of each injection;
         supply, via the CPU, a control signal to each fuel injector; and
         drive, via the drive circuit, each fuel injector.

2. A control device of an in-cylinder injection type internal combustion engine in which fuel is subjected to divided injections into a combustion chamber a plurality of times in one burning cycle,
   when fuel injection into the combustion chamber is resumed after the fuel injection into the combustion chamber is temporarily stopped according to an operation state of a vehicle,
   at least a first injection amount rate among the divided injections is controlled to decrease compared with remaining injection amount rates of the divided injections,
   wherein the decrease is greater when an estimated temperature of a piston crown surface of the combustion chamber is lower,
   wherein the control device comprises a CPU and a I/O LSI, the I/O LSI comprising an A/D converter and a drive circuit configured to drive fuel injectors,
   wherein the control device is configured to:
      set, via the CPU, a total injection pulse width;
      calculate, via the CPU, a minimum injection pulse width;
      calculate, via the CPU, an injection interval between divided injections;
      set, via the CPU, a number of divisions; and
      while the number of divided injection is less than the number of divisions,
         calculate, via the CPU, an injection pulse width;
         set, via the CPU, an injection timing of each injection;
         supply, via the CPU, a control signal to each fuel injector; and
         drive, via the drive circuit, each fuel injector.

3. The control device according to claim 1,
   wherein at least the first injection amount rate having been controlled to decrease among the divided injections is returned to a normal fuel injection amount rate other than the fuel injection amount when the fuel injection is resumed after a lapse of a return time set based on at least the fuel cut period.

4. The control device according to claim 3,
   wherein the return time is set longer as the fuel cut period is longer.

5. The control device according to claim 3,
   wherein an estimated temperature is estimated based on at least one selected from the group of a cooling water temperature, an lubricant temperature, and an intake air temperature, an intake air amount during the fuel cut period, an air fuel ratio, and an ignition period.

6. The control device according to claim 3,
   wherein, when the fuel injection is resumed, a first injection timing among the divided injections is retarded as the fuel cut period is longer.

7. The control device according to claim 3,
   wherein at least the first injection amount rate among the divided injections is decreased compared with the remaining injection amount rates of the divided injections based on at least the fuel cut period.

8. The control device according to claim 3,
   wherein the return time is set based on at least the fuel cut period.

9. The control device according to claim 2,
   wherein at least the first injection amount rate having been controlled to decrease among the divided injections is returned to a normal fuel injection amount rate other than the fuel injection amount when the fuel injection is resumed after a lapse of a return time set based on at least the fuel cut period or the estimated temperature.

10. The control device according to claim 9,
wherein the return time is set based on at least the estimated temperature.

11. The control device according to claim 9,
wherein the return time is set longer as the estimated temperature is lower.

12. The control device according to claim 9,
wherein the estimated temperature is estimated based on at least one selected from the group of a cooling water temperature, an lubricant temperature, an intake air temperature, an intake air amount during an fuel cut period, an air fuel ratio, and an ignition period.

13. The control device according to claim 9,
wherein, when the fuel injection is resumed, a first injection timing among the divided injections is retarded as the estimated temperature is lower.

14. The control device according to claim 9,
wherein at least the first injection amount rate among the divided injections is decreased compared with the remaining injection amount rates of the divided injections based on at least the estimated temperature.

* * * * *